United States Patent Office.

WALTER S. CROOKER, OF SHAMBURG, PENNSYLVANIA.

Letters Patent No. 106,127, dated August 9, 1870.

---

IMPROVED MEDICAL COMPOUND AND LINIMENT.

---

The Schedule referred to in these Letters Patent and making part of the same.

---

*To all whom it may concern:*

Be it known that I, WALTER S. CROOKER, of Shamburg, in the county of Venango and State of Pennsylvania, have invented a new and useful Improvement in Medical Compound; and I do hereby declare that the following is a full, clear, and exact description thereof, which will enable others skilled in the art to make and use the same.

This invention relates to a new and useful compound, to be used as a medicine for the cure of disease, to be taken internally, or applied as a liniment to the surface of the body; and It consists in the ingredients hereinafter named, combined in about the proportions mentioned, viz.:

Spirits of wine, two ounces; spirits of lavender, two ounces; spirits of niter, one ounce; spirits of ammonia, one ounce; spirits of camphor, one ounce; spirits of capsicum, one-fourth ounce.

This composition is used as a liniment in cases of sprains and bruises, rheumatism and neuralgic pains, stiffness of the neck or joints, soreness of the muscles, and all similar affections of the body; and also administered internally for the cure of colds, chills and fever, &c., it being a most excellent family medicine, the virtues of which have been thoroughly tested.

I am aware that most of the ingredients have before been used in liniments, combined in various ways; but I am not aware that spirits of niter (a most important ingredient of my compound) has hitherto been employed in combination with such ingredients.

Having thus described my invention,

I claim as new and desire to secure by Letters Patent—

The above-described compound, substantially as and for the purposes set forth.

WALTER S. CROOKER.

Witnesses:
JOHN M. JOHNSTON,
M. V. SHIPPEY.